United States Patent [19]
Reilly et al.

[11] 3,873,660
[45] Mar. 25, 1975

[54] METHOD FOR FORMING MULTIAXIALLY ORIENTED CONTAINERS

[75] Inventors: Joseph R. Reilly, Naugatuck; Thomas F. Sincock, Simsbury, both of Conn.

[73] Assignee: Monsanto Company, St. Louis, Mo.

[22] Filed: Feb. 26, 1973

[21] Appl. No.: 336,023

Related U.S. Application Data

[62] Division of Ser. No. 148,544, June 1, 1971, Pat. No. 3,754,851.

[52] U.S. Cl. ............... 264/89, 264/99, 264/296, 264/327, 264/DIG. 033, 425/DIG. 215, 425/DIG. 216
[51] Int. Cl. ............................................ B29c 17/07
[58] Field of Search ............ 264/89, 90, 92, 94, 96, 264/97, 98, 99, 294, 296, 327, DIG. 033; 425/DIG. 208, DIG. 215, DIG. 216

[56] References Cited
UNITED STATES PATENTS

| | | | |
|---|---|---|---|
| 2,331,687 | 10/1943 | Hobson | 264/97 |
| 2,331,702 | 10/1943 | Kopitke | 264/97 |
| 2,750,625 | 6/1956 | Colombo | 425/326 B |
| 3,311,684 | 3/1967 | Heider | 264/99 |
| 3,776,991 | 12/1973 | Marcus | 264/97 X |
| 3,781,395 | 12/1973 | Uhlig | 264/98 X |

FOREIGN PATENTS OR APPLICATIONS

| 1,147,118 | 4/1969 | United Kingdom | 425/326 B |
|---|---|---|---|

*Primary Examiner*—Jan H. Silbaugh
*Attorney, Agent, or Firm*—Michael J. Murphy

[57] ABSTRACT

Multiaxially oriented containers are formed from an extruded, molecularly orientable thermoplastic parison having a programmed wall thickness. The parison while at extrusion temperature is sealed at one end and expanded incrementally in a conditioning mold into the shape of a preform which is allowed to set therein for a brief time period in order to develop an outer skin at reduced temperature. The full wall of the variable thickness preform is then reduced in temperature to within the orientation temperature range and the preform then stretched longitudinally and expanded radially in a finishing mold to develop axial and radial orientation while forming the container. Since the thicker portion(s) of the programmed parison do not cool as much in the conditioning mold as do the thinner portion(s) they consequently subsequently stretch to a greater extent, and this phenomenom must be compensated for in the intitial programming step. The container finish is preferably formed in the conditioning mold while the thermoplastic is at elevated temperature. The molecularly orientable thermoplastic may be a high nitrile-group-containing polymer having excellent barrier properties of the type covered by the trademark LOPAC.

12 Claims, 5 Drawing Figures

METHOD FOR FORMING MULTIAXIALLY ORIENTED CONTAINERS

This is a division, of application Ser. No. 148,544, filed June 1, 1971 now U.S. Pat. No. 3,754,851.

BACKGROUND OF THE INVENTION

This invention is directed toward blow molding containers from tubular parisons and more particularly to blow molding containers where the thermoplastic is multiaxially molecularly oriented during forming.

It is known to molecularly orient thermoplastics in systems wherein such materials are being blow molded into hollow articles such as containers. Such molecular orientation is highly desirable, when the thermoplastic is of such a nature that orientation can be developed therein, since it can represent an attractive route toward improving the strength properties of the finished container. Alternative ways improving impriving strength involve changing the chemical structure of the thermoplastic during synthesis by means of strength imparting modifiers, or by increasing the wall thickness of the finished article. The former alternative may undesirably affect other properties of the material while the latter is rather costly, especially when the thermoplastic is one of the more recently developed low permeability nitrile based resins known as LOPAC, a registered trademark of Monsanto Company. Accordingly, it would seem desirale to develop such orientation during the forming operation since in any event the plastic must be molded in some way into the shape of the finished article.

Generally speaking, to molecularly orient an orientable thermoplastic, its temperature must be within a particular range at the time the material is stretched to develop the orientation, this range being lower than the temperature at which the thermoplastic is extruded yet considerably above room temperature.

Prior art teachings for developing such molecular orientation, such as that disclosed in U.S. Pat. No. 3,470,282, have been based on injection molding the thermoplastic followed by temperature conditioning and stretching axially and radially in the blow mold. Though this technique is generally satisfactory, it is not without its shortcomings. As is also known, it is highly desirable to develop a preselected distribution of wall thickness in the thermoplastic prior to final blowing in order to compensate for the different amount of stretching that occurs during blowing and consequently to achieve fairly uniform wall thickness in the finished article, or alternatively to provide a particular area of the finished article which has a different wall thickness than other areas for performance purposes. When the parison is formed by injection molding, the position of the entire injection mold surface corresponding to the parison shape must be controlled to obtain such a programmed parison whereas only the position of the much less extensive surfaces defining an annular outlet orifice need be controlled to vary the parison wall thickness when forming by extrusion. In addition, very high temperatures and pressures and consequently heavy equipment are required for injection molding, such temperature and pressure conditions possibly being deleterious in the sense of promoting degradation when the thermoplastic is of the heat sensitive variety. Also, when the thermoplastic is relatively viscous and still in flow at molding conditions, it may not be possible to conveniently inject such material into narrow injection molding cavities, or, put another way, the size of the container which it is possible to mold from such materials may be restricted since the material will not flow sufficiently far into the relatively narrow, deep, injection mold without undesirably deflecting the inner core pin. Also, it has been found that in transferring an injection molded parison to the blow molding station, it has a tendency to undesirably shrink and curl, possibly due to the flow orientation developed in the thermoplastic during the injection molding step.

Other prior art techniques, such as that disclosed in U.S. Pat. No. 3,294,885 and other related patents, teach reheating the thermoplastic back up to orientation temperature after initial cooling and prior to stretching. Though such techniques are again considered generally satisfactory under certain conditions, if the parison is programmed such that the wall thickness is varied as discussed previously, it is difficult to achieve a relatively uniform temperature through the full wall of the varying thickness material without using a special zone type of heating approach, and if substantial temperature gradients exist across the parison thickness the extent of stretch and consequently of molecular orientation will vary, i.e., the hot thin sections will stretch greater than the cooler thicker sections and the desired orientation level and material distribution pattern in the finished container may not be attainable.

Other problems with prior art blow molding orientation techniques have occurred in the area of manipulating the thermoplastic while at orientation temperature, e.g., shaping the finish of the container and/or forming a welded seal. Special heated mold members and/or multi-arm sealing mechanisms such as that set forth in U.S. Pat. No. 3,430,290 have been used in the past.

SUMMARY OF THE INVENTION

Now, however, there has been developed a unique process for providing multiaxial orientation in a blow molded article, which overcomes the aforementioned difficulties of the prior art.

Accordingly, it is a principal object of this invention to provide an improved combination of process steps for forming multiaxially oriented blow molded thermoplastic articles such as containers.

Another object of this invention is to provide such an improved process wherein the latent heat added to the thermoplastic during extrusion is utilized to bring the material to a temperature at which substantial molecular orientation of the thermoplastic occurs on stretching.

A further object of this invention is to provide such an improved process wherein a preselected wall thickness pattern of the material in the finished container is readily achievable by controlling the distribution of material in the parison from which the container is eventually formed.

An additional object of this invention is to provide such as improved method capable of producing multiaxially oriented containers at high speeds on a continuous basis.

Another object of this invention is to provide such an improved method wherein the affect of wall thickness on orientation temperature is minimal and not critical.

A further object of this invention is to provide an improved method of blow molding multiaxially oriented containers which is especially adaptable for use with high nitrile-group-containing thermoplastic polymers.

A further object of this invention is to provide means for carrying out the above mentioned objects.

Other objects of this invention will in part be obvious and will in part appear hereinafter.

These and other objects ae accomplished by providing a method of making a multiaxially oriented container having a controlled distribution of wall thickness which comprises extruding a molecularly orientable thermoplastic parison at a temperature above that at which substantial molecular orientation occurs, increasing the thickness of one portion of the parison with respect to another portion during extrusion, exposing the variable wall thickness parison to a temperature conditioning medium to bring its temperature to within the range at which substantial molecular orientation can occur, the temperature of the increased thickness portion of the parison being incrementally greater than said another portion of the parison, elongating the temperature conditioned parison to develop unaxial orientation, said elongating causing the thickened parison portion to stretch more than said another parison portion such that the wall thickness of the increased thickness portion is reduced and approaches that of said another portion, and expanding the thus elongated parison radially outwardly against the walls of a cavity of a blow mold corresponding to the configuration of the container to develop radial orientation and form said container.

In its more specific aspects, the method may include closing separated sections of a conditioning mold on a portion of the variable wall thickness parison just after it has been extruded and while it is at extrusion temperature, while pinching its open end shut in the joint between the conditioning mold sections and introducing pressurized fluid into the thus closed conditioning mold to incrementally expand the parison outwardly into contact with cooled surfaces of a cavity to form a preform of varying wall thickness having an outer skin at reduced temperature which is capable of supporting itself during transfer to subsequent phases of the process. The method disclosed is particularly suitable for processing high nitrile-group-containing thermoplastics where at least 60 percent by weight of the thermoplastic has been polymerized from a nitrile group containing monomer such as methacrylonitrile, the thermoplastic including at least one polymerized comonomer having at least one ethylenically unsaturated bond in its molecular structure, such as styrene.

The apparatus of the invention includes the parison conditioning mold upstream of the temperature conditioning means, said conditioning mold having an internal cavity similar to but smaller in surface area than the cavity of the finishing blow mold, and including means for cooling the walls of this internal cavity.

BRIEF DESCRIPTION OF THE DRAWINGS

In describing the overall invention, reference will be made to the accompanying drawings wherein.

DETAILED DESCRIPTION OF THE ILLUSTRATED EMBODIMENTS

Figure 1:
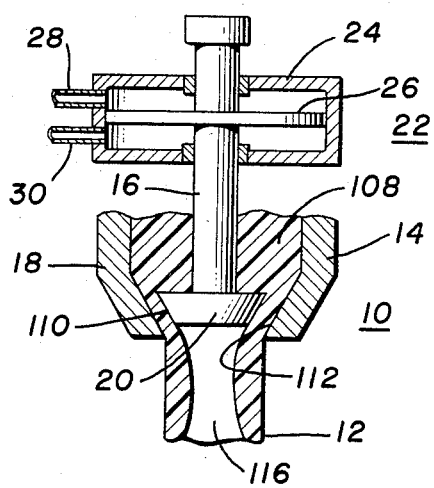
FIGS. 1–5 are partially sectioned, schematic, elevational views of a combination of apparatus parts illustrating successive steps in the process of the present invention.

Referring now to the drawings, there is illustrated in FIGS. 1–5, various parts of an integrated apparatus combination for forming multiaxially oriented containers having a controlled distribution of wall thickness therein.

The first portion of this apparatus combination illustrated in FIG. 1, comprises surface means, generally indicated as 10, for forming a parison 12. Surface means 10 comprises extruder head 14 having an axially movable mandrel 16 disposed therein. Head 14 has an end portion, which may converge inwardly as at 18, and which cooperates with tip member 20 at the forward end of mandrel 16 to define an annular extrusion outlet orifice between the inner surface 112 of end portion 18 and the outer surface 110 of tip member 20. "Extrusion," as herein utilized, is meant to define the forcing of a thermoplastic at elevated temperature through an annular outlet orifice formed by surface means such as tip member 20 and end portion 18 of an extruder head to form an elongated, unconfined, open ended, hollow tubular parison, such as 12.

Means, generally indicated as 22, are provided for programming the wall thickness of the thermoplastic during its formation into parison 12. Programming means 22 preferably comprises the system illustrated and described in complete detail in copending application Ser. No. 851,521, filed June 26, 1969, now U.S. Pat. No. 3,697,632, and assigned to the assignee of the present invention, the disclosure of which is incorporated herein by reference. Such programming means in the illustrated embodiment of FIG. 1 includes a housing 24 rigidly attached to the upper portion of mandrel 16 and piston 26 on mandrel 16 which is reciprocatably operable within housing 24 by means of the application of pressurized fluid on either side of piston 26 through nozzles 28 and 30.

Figure 2:
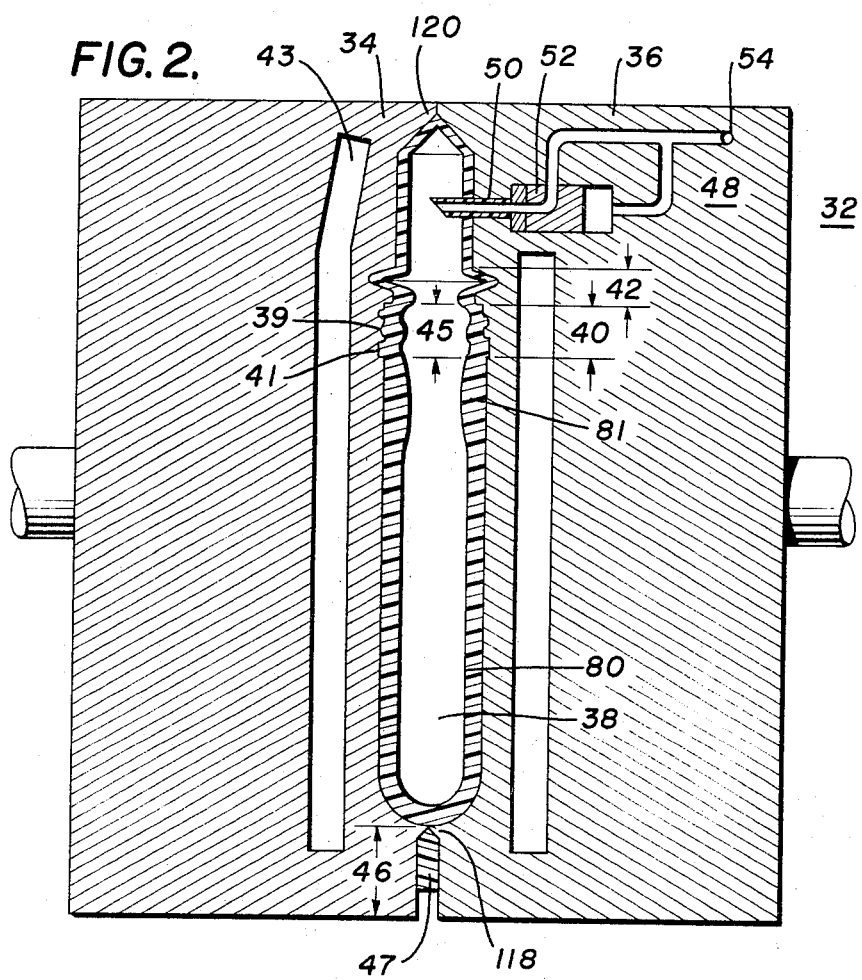

Positioned downstream of surface means 10 and programming means 22 is a parison conditioning mold generally indicated as 32 in FIG. 2. Conditioning mold 32 comprises separable sections 34 and 36 which together define internal cavity 38 when in closed position. Cavity 38 is similar to but smaller in surface area than that of the cavity within which the finished container is to be molded. In the embodiment of FIG. 2, cavity 38 is in the form of an elongated cylinder having a portion 40 above its center corresponding to the neck finish of a bottle, which may include thread defining portions 39 and shoulder 41. Also included as part of cavity 38, is moile holding section 42 immediately adjacent neck finish defining portion 40, neck flash holding section 44 at the upper end of cavity 38 and "tail" flash holding portion 46 at the lower end of mold 32. Conditioning mold 32 further includes means for regulating the surface temperature of the wall of internal cavity 38 which, in the illustrated embodiment, comprises a series of internal channels 43 adjacent the surface of cavity 38 through which conventional cooling means may be circulated to reduce the surface temperature of cavity 38.

First means, generally indicated as 48, are provided for expanding parison 12 in cavity 38, which, in the illustrated embodiment, comprises hollow needle 50 mounted on piston 52 which is operable in a bore formed in conditioning mold section 36 by means of pressurized fluid introduced through passage 54.

Figure 3:
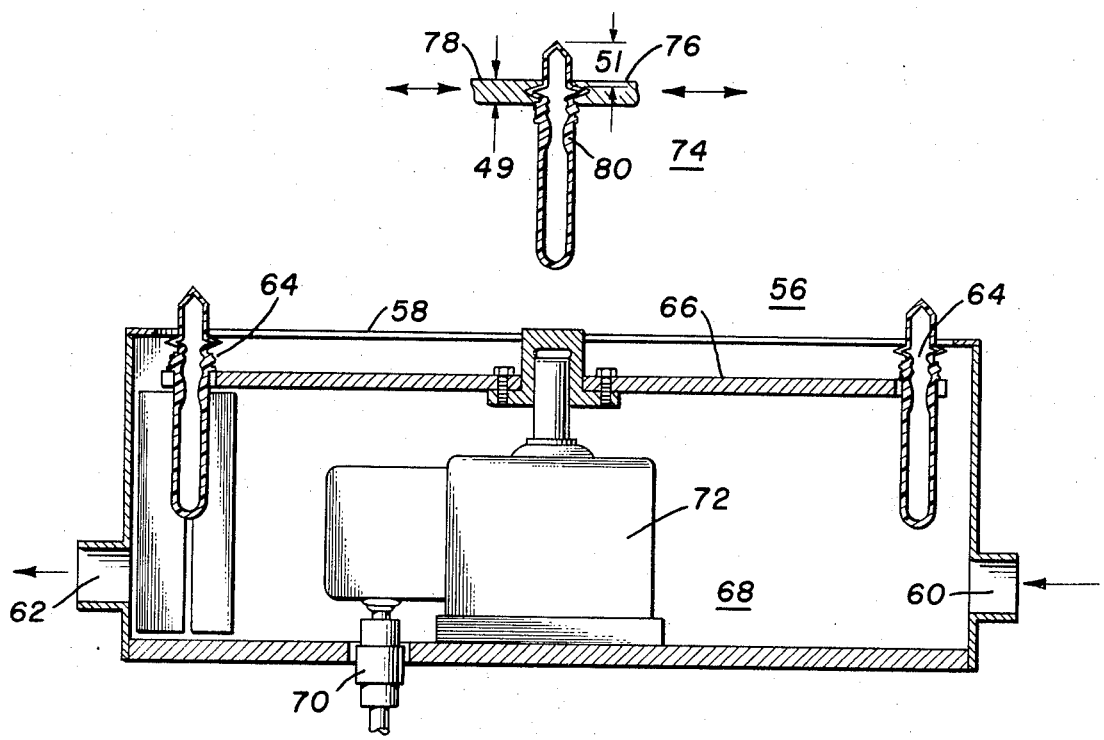
Figure 5:
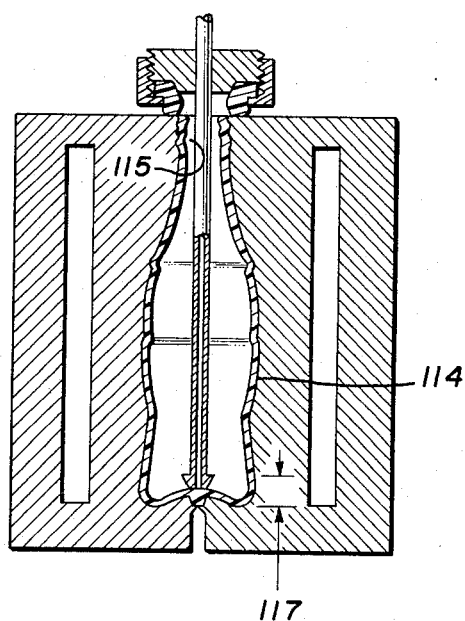
Figure 4:
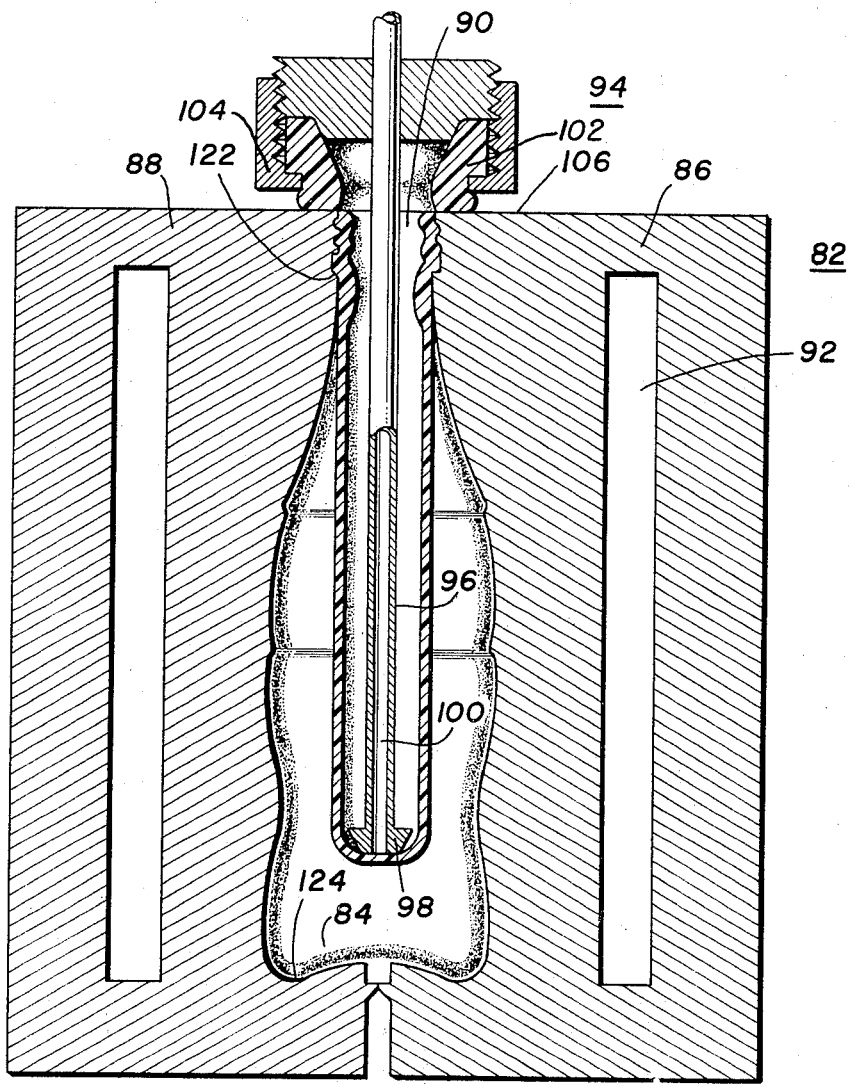

Temperature conditioning means, generally indicated at 56 in FIG. 3, are provided downstream of conditioning mold 32 for bringing the temperature of parison 12 to within the range at which substantial molecular orientation occurs on stretching. Means 56 in the illustrated embodiment of FIG. 3, comprise housing 58 having inlet 60 and outlet 62 formed therein for passage of temperature conditioned air therethrough to reduce the temperature of one or more thermoplastic preforms 80 to the desired orientation temperature. Such preforms are seated in holders 64 which are suspended from carrier plate 66 which in turn is rotated by drive means 68, which may include an electric motor 70 and associated gear reducer 72.

Means 74 may be provided (FIG. 3) for transferring a parison portion when shaped into a preform from conditioning mold 32 to the temperature conditioning means 56. Transfer means 74 may include a pair of jaws 76 and 78 which are closeable around the illustrated protruding surface portion of moile section 49 of preform 80.

Finishing mold 82 (FIG. 4) is provided downstream of conditioning mold 38 and has an internal cavity configuration 84 conforming to the shape of the container to be molded therein. Finishing mold 82 includes separable sections 86 and 88 which when in the closed position together define cavity 84. Mold 82, in the embodiment of FIG. 4, has an open end 90 for the purpose of admitting shaft 96 into cavity 84, and is also equipped with cooling means for regulating the surface temperature of the wall of cavity 84. Such cooling means also may comprise a series of channels 92 through which a suitable cooling medium may be circulated in a well known manner.

Means 94 (FIG. 4) operable through opening 90 in finishing mold 82 are provided for longitudinally stretching preform 80 prior to full radial expansion in finishing mold 82. Such stretching means may include axially extending shaft 96 having a foot portion 98 on its leading end and a hollow passage 100 formed therein.

Second means, distinct from the first expanding means 48, which function in conditioning mold 38, are provided for expanding the parison portion or preform 80 in finishing mold 82. Such second means include a source of pressurized fluid supply (not shown) connected by conventional conduits to passage 100 in shaft 96. Resilient sealing member 102 supported on retaining ring 104 is provided for compressively seating on upper surface portion 106 around opening 90 of finishing mold 82 to seal the interior portion of preform 80 from the surroundings during the container forming step.

In operation, a molecularly orientable thermoplastic 108, (FIG. 1) such as a high nitrile-group-containing polymer comprising 90% of polymerized methacrylonitrile and 10% polymerized styrene, is forced through extrusion head 14 by means of a conventional extruder (not shown) toward surface means 10. Though the preferred material for use in the method of the present invention is such a high nitrile-group-containing polymer, it should be understood that any molecularly orientable thermoplastic may be utilized. Typical alternative thermoplastics include polymerized 1-olefins such as polyethylene and polypropylene, and polyvinyl chloride.

Polymer 108 is forced between outer surface 110 of tip member 20 and inner surface 112 of end portion 18 of extruder head 14 in a continuous manner to form elongated, unconfined, open ended, hollow parison 12 at a temperature in excess of that at which substantial molecular orientation occurs on stretching. Such a temperature for the high nitrile-group-containing polymer of the illustrated embodiment is within the range of between 400° to 500°F.

As thermoplastic 108 is being forced through surface means 10, piston 26, by means of pressurized fluid introduced through nozzle 30 is forced upwardly so as to increase the size of the opening between tip member 20 and end portion 18, thereby correspondingly increasing the thickness of the wall of parison 12 during its extrusion, as illustrated in FIG. 1. Such upward movement may be caused to occur at the precise time during the extrusion that the parison portion which will define portion 115 of bottle 114 (FIG. 5) adjacent its neck finish 45, is issuing from the outlet. Such a preselected increase in wall thickness is readily achievable by means of the technique disclosed in copending application Ser. No. 851,521, filed June 26, 1969, now U.S. Pat. No. 3,697,632. Obviously, downward movement of tip member 20 to decrease the size of the opening will decrease the thickness of the wall of extruding parison 12.

When a sufficient portion of parison 12 to occupy the desired space between sections 34 and 36 of mold 38 has been extruded, sections 34 and 36 are caused to come together on such a portion of said variable wall thickness parison 12, and in so doing, its open end 116 is pinched shut by means of pinch lands 118 in the joint between sections 36 and 34. The variable wall thickness parison is thus enclosed within conditioning mold 32. The other end of the parison portion may be severed from the extrusion head 14 by conventional knife means (not shown) or may be isolated from head 14 by clamping between pinch lands 120 at the upper end of mold 32. As can be appreciated, since the temperature of the thermoplastic of parison 12 is relatively high at this stage of the process, no difficulty will be encountered in forming a tight welded end(s) between the surface of the pinch lands of conditioning mold 32. After the portion of the parison for shaping within conditioning mold 32 has been extruded and enclosed, conditioning mold 32 is moved away from surface means 10 such that another similar conditioning mold may enclose the next subsequent parison portion being continuously extruded and programmed in the manner illustrated in FIG. 1.

Hollow needle 50 is then caused to reciprocate through the wall of the enclosed parison in the flash defining portion 51 thereof, whereupon pressurized fluid is introduced through passage 54, the interior of needle 50 and then into the mold enclosed parison portion to expand it incrementally outwardly into contact with the cooled surfaces of cavity 38, thereby forming a self supporting preform having an elongated body of varying wall thickness, such preform having an outer skin at reduced temperature due to its contact with the cooled surface of cavity 38. The extent of outward expansion of the variable wall thickness parison portion within conditioning mold 32 is minimal, is rather critical, and should be between 150 to 300% of the smallest inside diameter of the parison portion formed during extrusion. For example, as can be seen from FIG. 2, the portion 81 of preform 80 after expansion is not greatly reduced in thickness over that which it had when issuing from surface means 10 in FIG. 1, (for example, from 0.250 to 0.180 inch). This is important, since if the extent of expansion occurring in conditioning mold 32 is too great, the stresses which necessarily must be developed in the thermoplastic to provide the desired molecular orientation cannot be sufficiently generated during the subsequent blowing step if the initial expansion at the elevated extrusion temperature (whereat such stresses cannot be developed) is excessive. On the other hand, some expansion is required and is preferably that which is necessary to form molded neck finish 45 on preform 80 while the thermoplastic is within the general temperature range of 400° to 500°F., such neck finish molding also desirably being carried out at this elevated thermoplastic temperature in order to accurately define the rather critical closure supporting surfaces of bottle 114. Such expansion is also desirous for the purpose of forming an outer reduced temperature skin on the preform relatively quickly in order that it be able to support itself without use of auxiliary means during the subsequent transfer stages of the process.

After a relatively brief period of time (e.g., on the order of 5 to 15 second(s) subsequent to the expansion of the parison portion in conditioning mold 32) sections 34 and 36 are caused to be separated and the preform 80 having a blown, accurately defined neck finish 45, ejected from mold 32 which is then immediately available to accept another parison portion for the next cycle. Opposing jaws 76 and 78 then close on the moile section of preform 80 and transport and deposit it, (either manually or in an automated fashion) in holders 60 of temperature conditioning means 56. However, the moile section and neck flash may be removed, if desired, between conditioning mold 38 and temperature conditioning means 56.

Likewise, the "tail" section 47 (FIG. 2) may be broken away in a conventional manner either at this stage of the process, i.e., after preform shaping and prior to final blowing, or after final blowing of bottle 114. Since the thermoplastic is still quite pliable at this stage of the process in comparison with its subsequent condition, removal of the waste portions at this stage is facilitated.

Preform 80 is retained in temperature conditioning means 56 for a period of time sufficient to reduce the temperature of the thermoplastic such that it is within the range at which substantial molecular orientation can occur on stretching. For the high nitrile-group-containing polymer of the illustrated embodiment, this range is between about 250° to 350°F., and will vary somewhat from this range for other thermoplastics. As will be appreciated, the temperature of the outer skin of the preform developed through shock chill contact with cooled surfaces of cavity 38 of conditioning mold 32 will tend to increase as a result of its heat conductive contact with the hotter inner surfaces of the integral preform wall. Also, the thicker portion 81 of preform 80 will be at a slightly greater temperature than that of unthickened adjoining portion(s), since, for a given period of time, the amount of heat extracted from the thicker portion will be less than that from the thinner portion(s), though it is important that the entire wall of the preform still be within a temperature range at which substantial molecular orientation can occur on leaving temperature conditioning means 56. The time during which the preform will be exposed to a temperature conditioning medium is obviously dependent on the temperature and nature of the latter, the nature of the thermoplastic and the thickness and temperature of the preform. Generally speaking the time of exposure to such a medium for most orientable thermoplastics is between 5 to 200 seconds.

In connection with the foregoing, after the preform is transferred from the conditioning mold to the temperature conditioning zone, inner wall sections of such variable thickness preform are reduced in temperature in such zone that the entire wall thickness of such sections is within a temperature range at which substantial molecular orientation can occur, the thinner portions of such sections being at a lower temperature than the thicker portions.

After the thermoplastic of the wall of preform 80 has been brought within the molecular orientation temperature range, it is removed from holder 64, either automatically or manually, and transferred to a position between the open sections of finishing mold 32, which are then closed theron to enclose it within sections 84 and 86. As is apparent from FIG. 4, the thus enclosed preform 80 is well supported at annular shelf 122 formed in each of sections 86 and 88. In the embodiment illustrated in FIG. 4, the moil 49 and waste section 51 above neck finish 45 must have been removed at this stage of the process in order for shaft 96 to enter the supported parison. However, it should be understood that preform 80 could be formed in conditioning mold 32 without closing off one end, whereupon such an open ended preform could be positioned in finishing mold 82 without removing the flash adjacent the neck finish. In any event, prior to final blowing, and in the illustrated embodiment, after it is enclosed within mold 32, the length of the temperature conditioned preform 80 is increased by introducing foot 98 on shaft 96 against the inner surface of the closed end thereof such that the preform is stretched longitudinally toward lower surface 124 of cavity 84 of finishing mold 82. Such longitudinal stretching, while within the molecular orientation temperature range, serves to develop uniaxial molecular orientation in the thermoplastic. Also, since thickened portion 81 of preform 80 is at an incrementally greater temperature than an adjoining unthickened portion(s) thereof, such elongation causes the thick portion to stretch more than the cooler thinner portion with the result that thermoplastic from the thick section 81 moves into the thinner section which eventually forms the base area 117 of bottle 114. Thus, contrary to expectations, to program material into the base of the bottle in the present invention, it is necessary to add it to that part of the preform adjacent the neck and well above the lower section of the preform. After the preform has been thus stretched in the axial direction, and preferably after the closed end is forced against base portion 124 of the cavity, pressurized fluid is introduced through passage 100 in shaft 96 to expand the elongated parison or preform radially outwardly against the walls of cavity 84 and thus develop radial orientation in the temperature conditioned thermoplastic while forming the body of the container. On contacting the cooled surfaces of cavity 84, the temperature of the thermoplastic will be reduced sufficiently further to lock in the orientation stresses produced during the longitudinal and radial stretching of the thermoplastic. As can be appreciated, the thin cooler sections of preform 80 will stretch during final expansion less than thicker hotter sections thereof (e.g., that identified as 81) thereby producing a relatively uniform wall thickness distribution in both the axial and circumferential directions in the finished container, even though the extent of stretching during the final blowing must necessarily vary in order to produce the variable diameter container 114.

The above description and particularly the drawings are set forth for purposes of illustration only and are not to be taken in a limited sense.

Though any type of orientable thermoplastic may be used in the present invention, the preferred thermoplastics are those wherein a major component thereof has been polymerized from a monomer containing at least one nitrile group (-CN) in its molecular structure. This nitrile-group-bearing polymerized monomer should be present at a level of a least 60 percent by weight in the thermoplastic, and preferably at a level of between 85 to 95 weight percent, in order to provide the formed article with the combination of chemical and physical properties which necessarily must be present in order that the article be effective in the preferred use of packaging environmentally sensitive materials. When shaping such polymers according to the technique of the present invention, the temperature of the thermoplastic during the various stages of the process should be within the following ranges in order to obtain the desired molecular orientation and material distribution in the finished product: extrusion — 400° to 500°F.; after conditioning and during longitudinal and radial stretching — 250° to 325°F. The temperature will vary within the limits of the aforementioned ranges depending on the level of the nitrile group containing constituent in the polymer. Generally speaking, as the level of the nitrile group containing constituent in the polymer is increased, the temperature of the thermoplastid during the various steps of the process should accordingly be increased whereas the reverse should be done as the level is decreased toward 60 weight percent.

Typical of the high nitrile-group-containing monomers suitable for use in the thermoplastics processable according to the present invention are, for example, acrylonitrile, methacrylonitrile, ethacrylonitrile, propacrylonitrile, alphachloroacrylonitrile, alpha-bromoacrylonitrile, alpha-fluoroacrylonitrile, alpha-cyano-styrene, vinylidene cyanide, alpha-cyano acrylic acids, alpha-cyano acrylates such as alpha-cyano methyl acrylates, alpha-cyano ethyl acrylates, and the like, 2, 3-dicyanobutene-2, 1, 2-dicyanopropene-1, alpha-methylene glutaronitrile, and the like. The preferred monomers are acrylonitrile and methacrylonitrile with the latter being particularly preferred.

Any monomer or monomers which are copolymerizable with the nitrile-group-containing component of the polymer may be employed in the practice of this invention. Such a co-monomer is present for the purpose of improving melt processing (parison shaping) of the thermoplastic, since if there is an excess of CN groups in the polymer, the material becomes polar and this tends to reduce the melt processability characteristic of the polymer. The co-monomer tends to reduce this tendency but not sufficiently so as to destroy the barrier properties imparted by the nitrile-groups-containing constituent. This co-monomer can be present up to a level of 40 percent by weight, 5 to 15 percent by weight being preferred. Exemplary of such monomers are ethylenically unsatufated aromatic componds such as styrene, alpha-methyl styrene, ortho-, meta-, and para-substituted alkyl styrenes, e.g., ortho-methyl styrene, ortho-ethyl styrene, para-methyl styrene, paraethyl styrene, ortho-, meta-, or para- propyl styrene, ortho-, meta-, or para-isoproply styrene, ortho-, meta-, para-butyl styrene, ortho-, meta-, or para- secondary butyl styrene, ortho-, meta-, or para- tertiary butyl styrene, etc., alpha-halogenated styrene, e.g., alpha-chlorostyrene, alphabromostyrene, ring-substituted halogenated styrenes, e.g., ortho-chlorostyrene, para-chlorostyrene, and the like; esters of ethylenically unsaturated carboxylic acids e.g., methyl acrylate, methyl methacrylate, ethyl methacrylate, ethyl acrylate, butylacrylate, propyl acrylate, butyl methacrylate, glycidol acrylate, glycidol methacrylate, and the like, ethylenically unsaturated acids, carboxylic acids such as acrylic acid, methacrylic acid, propacrylic acid, crotonic acid, critaconic acid, and the like. Vinyl esters, e.g., vinyl formate, vinyl acetate, vinyl propionate, vinyl butyrate, etc.; vinyl and vinylidene halides, e.g., vinyl chloride, vinyl bromides, vinylidene chloride, vinylidene chloride, vinyl fluorides, etc.; vinyl ethers, e.g., methyl vinyl ether, ethyl vinyl ether, alpha-olefins, e.g., ethylene, propylene, butene, pentene, hexene, heptene, oxtene, isobutene, and other isomers thereof.

When it is desired to provide the finished article with substantially enhanced physical properties, up to 40 percent by weight of impact modifying materials which are compatible with the high nitrile based polymer of the resin may be used. The proportion of such materials when considered with the level of non-nitrile-group containing material in the polymer should not be allowed to exceed 40 percent if radical shifts in property levels of the finished product are to be avoided. Typical impact modifiers which may be blended with the polymer of the present invention are synthetic or natural rubber components such as, for example, polybutadiene, butadiene-styrene copolymers, isoprene, neoprene, nitrile rubbers, acrylate rubbers, natural rubbers, interpolymers of butadiene with acrylonitrile, methacrylonitrile, tertiary butyl styrene, styrene and mixtures thereof such as acrylonitrile-butadiene copolymers, methacrylonitrile-butadiene copolymer, acrylonitrile-styrene-butadiene terpolymers, methacrylonitrile-styrene-butadiene terpolymers, methacrylonitrile-tertiarybutyl styrene-butadiene terpolymers, acrylonitrile-tertiarybutyl styrene-butadiene terpolymers, ethylene-propylene copolymers, chlorinated or fluorinated rubbers, etc. Other tough polymers, not considered or known as rubber based materials may be used as impact modifiers. These include polycarbonate, polyethylene, polyethylene/vinyl acetate, polyethylene/vinyl alcohol, polyamides, polyketones, pheonoxies, polyacetals, and silicones.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A method of forming a biaxially oriented container having a controlled distribution of wall thickness therein, said method comprising the steps of:

a. continuously extruding an elongted, unconfined, hallow, thermoplastic parison at a temperature in excess of that at which substantial molecular orientation of the thermoplastic occurs;

b. varying the thickness of the wall of the parison during extrusion in accordance with a predetermined program;

c. closing separated sections of a conditioning mold on a portion of said variable wall thickness parison while pinching its end shut in the joint between said sections;

d. introducing pressurized fluid into the conditioning mold-enclosed parison portion to expand it outwardly into contact with cooled surfaces of a cavity in the conditioning mold to form a self-supporting preform of varying wall thickness having an outer skin at reduced temperature;

e. transferring said self-supporting preform from the conditioning mold to a temperature conditioning zone;

f. reducing the temperature of inner wall sections of the variable wall thickness preform in said conditioning zone such that the entire wall thickness of such sections is within a temperature range at which substantial molecular orientation can occur, the thinner portions of such sections of said wall being at a lower temperature than the thicker portions;

g. longitudinally stretching the temperature-conditioned preform to impart axial orientation thereto; and h. expanding the longitudinally stretched, variable wall thickness, temperature-conditioned preform radially outwardly against cooled surfaces of a cavity of a finishing mold to form the biaxially oriented container and reduce the temperature of the thermoplastic sufficiently to lock in the orientation stresses produced during the longitudinal and radial stretching, the thin, cooler portion of such sections of said preform stretching less than the thicker hotter portions thereof during said expansion, thereby producing said wall thickness distribution in said container.

2. The process of claim 1 wherein the thickness of that portion of the wall of the parison which will constitute the upper portion of the preform and subsequently the area adjacent the neck of the finished container is increased during extrusion.

3. The process of claim 1 wherein the extent of expansion of the parison portion in the conditioning mold is between 150 to 300% of the inside diameter of the parison during extrusion.

4. The process of claim 1 wherein a molded neck finish is formed on the preform in the conditioning mold while the thermoplastic is at said temperature above that at which substantial molecular orientation occurs.

5. The process of claim 4 wherein said neck finish is formed by expanding a section of the parison portion outwardly against molding surfaces of the conditioning mold corresponding to said neck finish.

6. The process of claim 5 wherein said container is a bottle having a narrow neck.

7. The process of claim 1 wherein at least 60 weight percent of the thermoplastic has been polymerized from methacrylonitrile monomer, the remainder thereof including at least one polymerized comonomer having at least one ethylenically unsaturated bond in its molecular structure.

8. In the method of forming a blow molded biaxially oriented container from an extruded thermoplastic parison which includes exposing the parison to temperature conditioning means to bring its temperature to within the range at which substantial molecular orientation can occur and then longitudinally stretching the temperature-conditioned parison prior to blow molding to develop uniaxial orientation, the improvement which comprises closing separated sections of a conditioning mold on said parison while pinching its end shut in the joint between said sections and the introducing pressurized fluid into the enclosed parison to incrementally expand it outwardly into contact with cooled surfaces of a cavity in the conditioning mold to form a self-supporting closed end preform having an outer skin at reduced temperature suitable for transfer to said temperature conditioning means.

9. A method of making a biaxially oriented, narrow necked container having controlled wall thickness distribution from a high nitrile polymer, said method comprising:

a. extruding a thermoplastic parison of said high nitrile polymer at a temperature within the range of between 400° to 500°F.;

b. increasing the thickness of one portion of said parison with respect to another portion during said extrusion;

c. enclosing said variable wall thickness parison in a conditioning mold;

d. expanding said variable wall thickness parison incrementally outwardly against cooled walls of a cavity in said conditioning mold to form a preform having a molded neck finish and an elongated body containing said variable thickness portions;

e. reducing the temperature of the body of said preform such that it is within the range of between 250° to 325° F., the average temperature of the wall of the thickened portion corresponding to the thickened portion of the parison being within said temperature range but incrementally greater than the average wall temperature of said another portion of said body;

f. increasing the length of said temperature-conditioned preform such that the thickened portion at said incrementally greater average wall temperature stretches more than said another portion and is consequently reduced in thickness, said length increase creating uniaxial molecular orientation in the preform; and g. expanding the thus increased-length preform radially outwardly against the wall of a cavity corresponding to the configuration of the container to create radial orientation in the thermoplastic and form said biaxially oriented container.

10. A method of forming a molecularly oriented container which comprises:

a. extruding an unconfined, hollow thermoplastic parison at a temperature in excess of that at which substantial molecular orientation of the thermoplastic occurs on stretching;

b. closing sections of a parison conditioning and shaping mold on said parison to enclose said parison therein while pinching its end shut between the sections;

c. subjecting the enclosed parison to a deforming pressure while at said temperature to expand it outwardly against cooled molding surfaces of said conditioning and shaping mold to form a preform having a body portion and a molded finish;

d. transferring said preform while still in a pressure sensitive but dimensionally stable state from the conditioning and shaping mold to a temperature conditioning zone;

e. bringing the temperature of the thermoplastic of at least the body portion of the preform in the conditioning zone to within the range at which substantial molecular orientation of the thermoplastic occurs on stretching;

f. transferring the preform from the conditioning zone to a finishing mold after the temperature of the body portion thereof has reached such range; and g. longitudinally stretching and radially expanding the body portion only of said preform while within said temperature range against molding surfaces of the finishing mold to form said molecularly oriented container.

11. The method of claim 10 wherein the thermoplastic parison has a variable wall thickness.

12. The method of claim 10 wherein the thermoplastic material comprises a major portion of a polymerized monomer containing at least one nitrile group in its molecular structure.

* * * * *